Figure 6:
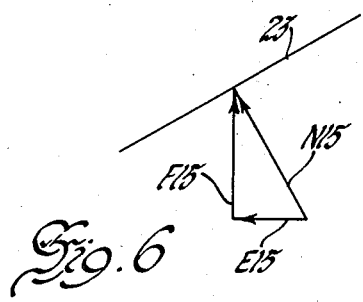

April 21, 1959     B. M. EDSALL     2,882,757
SELF-ENERGIZING ASSISTOR FOR TORQUE-ESTABLISHING DEVICES
Filed June 25, 1956     3 Sheets-Sheet 1
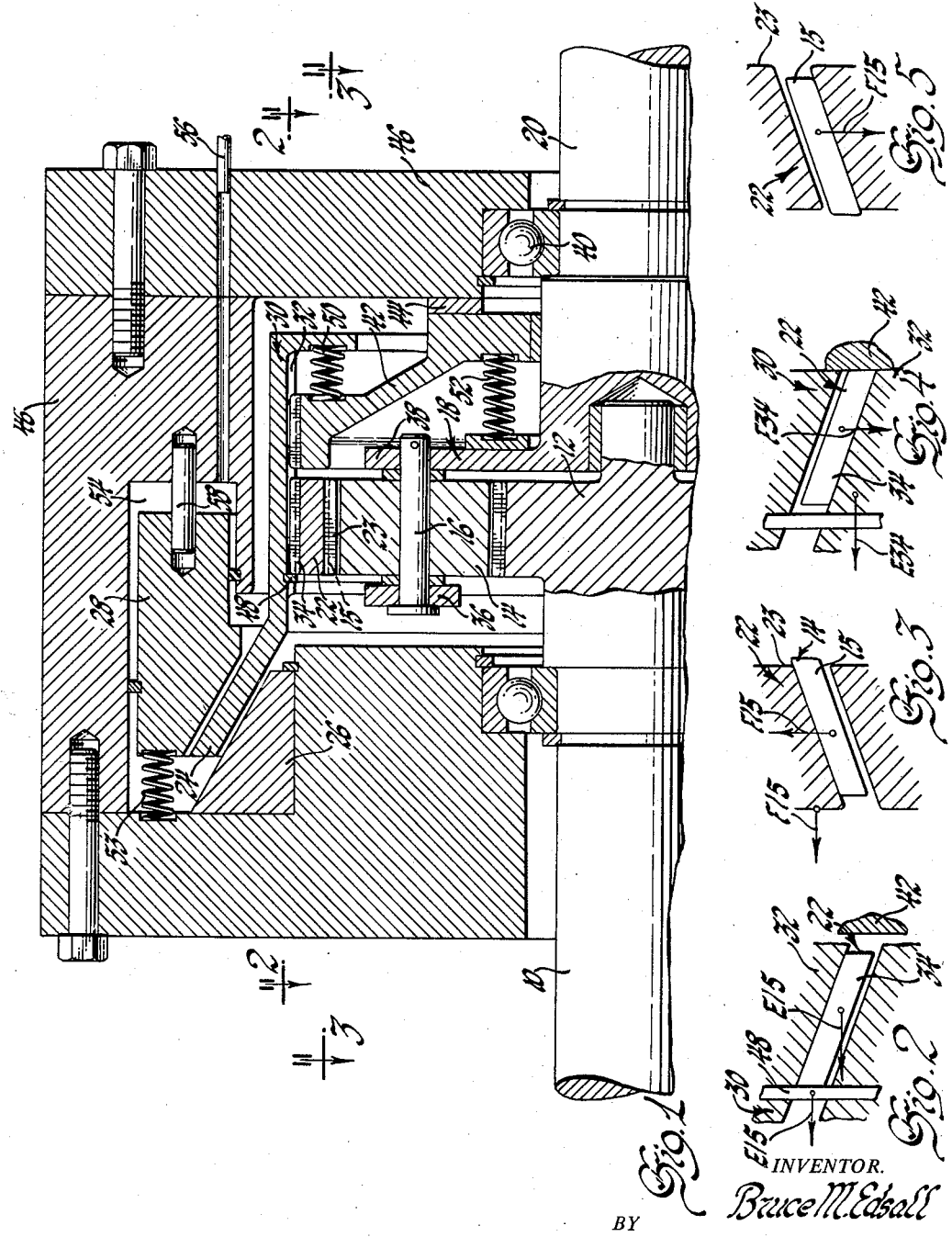
INVENTOR.
Bruce M. Edsall
BY
T. L. Chisholm
ATTORNEY April 21, 1959     B. M. EDSALL     2,882,757
SELF-ENERGIZING ASSISTOR FOR TORQUE-ESTABLISHING DEVICES
Filed June 25, 1956

INVENTOR.
Bruce M. Edsall
BY
T. R. Chisholm
ATTORNEY

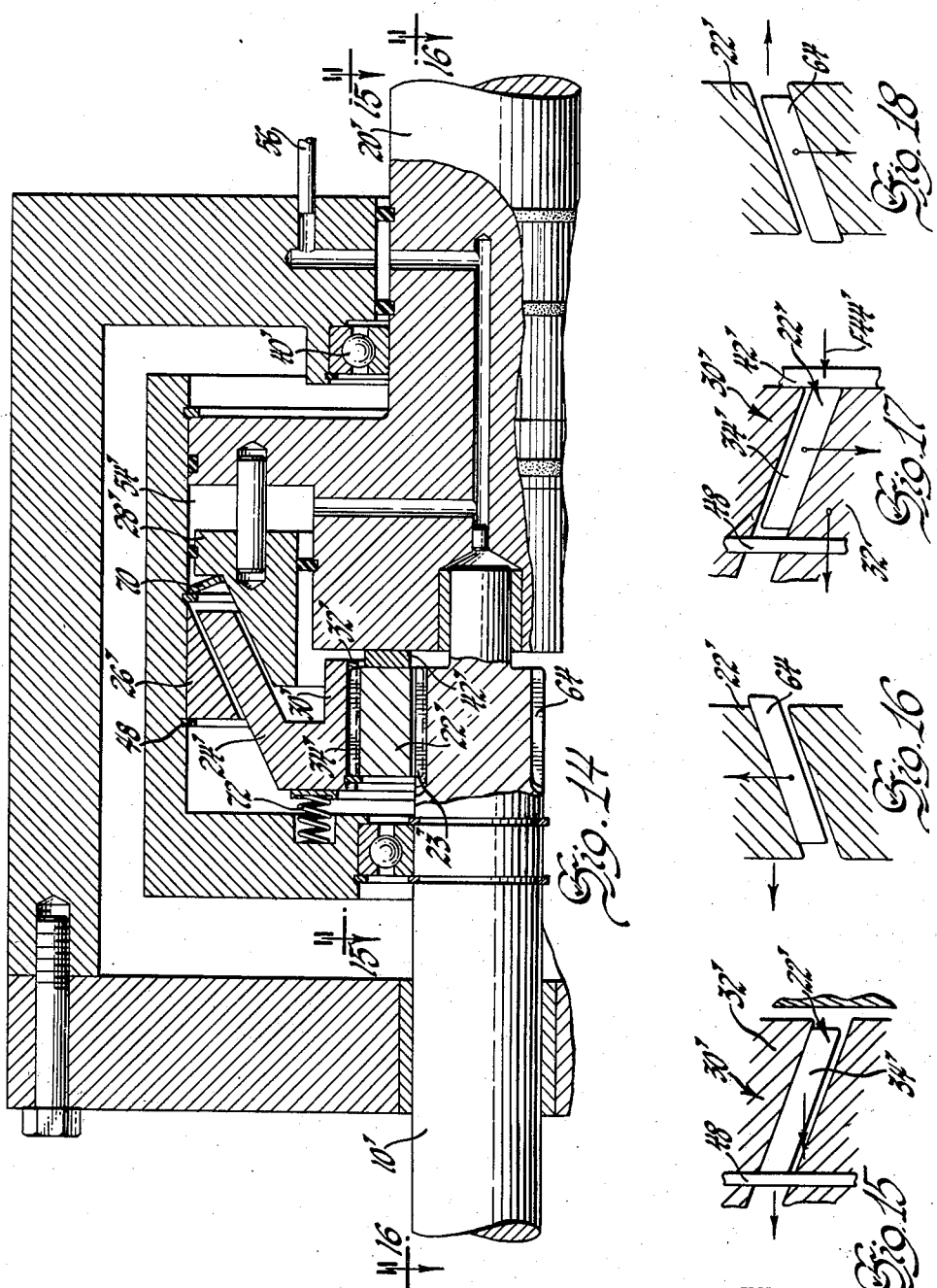

United States Patent Office 2,882,757
Patented Apr. 21, 1959

2,882,757

SELF-ENERGIZING ASSISTOR FOR TORQUE-ESTABLISHING DEVICES

Bruce M. Edsall, Oak Park, Mich., assignor to General Motors Corporation, Detroit, Mich., a corporation of Delaware Application June 25, 1956, Serial No. 593,711

9 Claims. (Cl. 74—801)

This invention relates to mechanical movements or operating devices in which a reversible force, tending to move an element in either of opposite directions, produces in either case a force acting in the same direction on a second element. It is particularly, but not exclusively, adapted to be used as a self-energizer or assistor for torque-establishing devices and it will be described for example only as so applied. Also, such torque-establishing devices are particularly, though not exclusively, adapted to be used to establish or connect power trains in transmissions of automobiles, and such use is described for example only.

It is common in power transmissions and other apparatus to use torque transmitting devices such as gears or splined shafts which have teeth which are inclined relative to the axis of rotation, usually helical teeth. It is also common to use other torque-establishing means, operated by friction for establishing power trains, that is for connecting a driving and a driven member in torque transmitting relation. Clutches and brakes are examples of such friction torque-establishing devices.

It is common knowledge that when such gears have inclined teeth, the sides of the teeth form inclined cams which under the torque reactions in the gearing urge the gears to move axially. Where the mechanism requires that one of such axially movable gears be coupled to another part, this axial force has been used to assist an operating device to urge friction surfaces toward each other. This might be termed a self-energizing friction torque-establishing device.

One disadvantage with this arrangement is that while the torque reaction satisfactorily energizes the friction torque-establishing device or assists in its engagement when the torque is in one direction, by the same token it resists engagement of the friction torque-establishing device when the torque is reversed. Torque reverses either when the driving element is reversed to drive the apparatus in the opposite sense of rotation or when the direction of power flow is reversed while keeping the sense of rotation the same. An example of the former occurs when the direction of drive of an automobile is reversed. In forward drive, the propeller shaft drives the rear axle shafts in one sense of rotation; in reverse the propeller shaft drives the axles in the opposite sense of rotation but power flow or torque flow is in the same direction, that is from the propeller shaft to the wheels. An example of torque reversal without change of sense of rotation occurs in an automobile when the throttle is released and the car overruns, driving the engine instead of being driven by it. In this case the engine shaft continues its forward rotation but the propeller shaft is driving the engine shaft and power flows in the opposite direction.

It has been the practice to select the direction of the pitch of helical teeth in transmissions having self-energizing friction torque-establishing devices so that the torque reaction during normal driving, such as forward, tends to energize the friction torque-establishing devices, in which case the condition of opposing the action of the friction torque-establishing devices during abnormal operation, such as driving backward, is a disadvantage that is tolerated.

It is an object of my invention to provide a self-energizing operator or assistor for a friction torque-establishing device which will energize or assist engagement regardless of the direction of torque. The invention is particularly, though not exclusively, suitable for automobile transmissions, and is described herein, for example only, as applied to such transmission.

Figure 7:
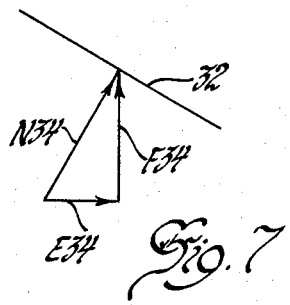
Figure 8:
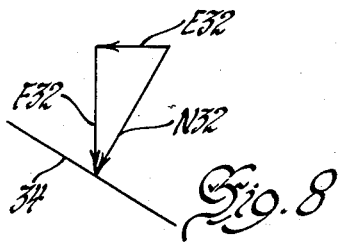
Figure 9:
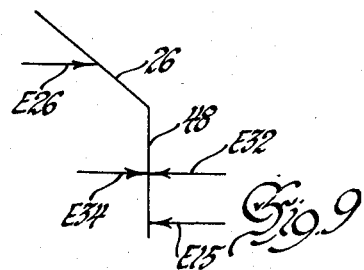
Figure 10:
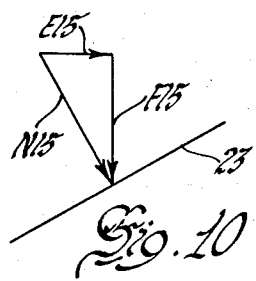

Fig. 1 is half of a symmetrical longitudinal section of a transmission embodying one form of the invention, Fig. 2 is a partial developed section on the line 2—2 of Fig. 1 showing the relationship between the teeth or splines of one part of the self-energizing actuator or assistor in one direction of torque flow, Fig. 3 is a similar developed section on the line 3—3 showing another part of the self-energizing assistor when the torque flows in the same direction as in Fig. 2, Figs. 4 and 5 are sections corresponding to Figs. 2 and 3 and are taken on the section lines 2—2 and 3—3 of Fig. 1 respectively, when the torque flow is in the opposite direction, Fig. 6 is a vector diagram of forces in that part of the self-energizing assistor shown in Fig. 3 when the torque is in one direction, Figs. 7, 8 and 9 show forces in that part of the self-energizing assistor shown in Fig. 2 when the torque is in the same direction, Figs. 10, 11, 12 and 13 correspond to Figs. 6 to 9, respectively, and show the forces in the same parts when the torque is in the opposite direction, Fig. 14 is a section corresponding to Fig. 1 showing a modified form of the invention, Fig. 15 is a partial developed section on the line 15—15 of Fig. 14 showing the relationship between the teeth of part of the self-energizing actuator of the modified form when the torque flows in one direction, Fig. 16 is a section corresponding to Fig. 15 on the line 16—16 of Fig. 14 showing the relationship between the teeth of another part of the self-energizing actuator when the torque flows in the same direction as in Fig. 15, and Figs. 17 and 18 are sections corresponding to Figs. 15 and 16 and taken on the line 15—15 and 16—16, respectively, when the torque flow is in the opposite direction.

In Fig. 1 an input shaft 10 is fixed to a sun gear 12 meshing with a planet gear 14 having helical or inclined teeth 15 and journaled on a shaft 16, mounted in a planet carrier 18 fixed to an output shaft 20. The planet gear 14 also meshes with an internal gear or ring gear 22 having internal teeth 23 of the same direction of slope as the teeth 15. The power train may be completed when the ring gear, which in this case is the reaction gear, is held fast by any suitable means, such as a friction torque-establishing device including a cone 24 fixed to the ring gear 22 and pressed against a fixed cone 26 whenever the cone 24 is moved to the left by any suitable actuator, such as a third cone which may form part of a piston 28 in a hydraulic cylinder, as will be explained.

A gear is regarded as having right-hand teeth or teeth having a right-hand inclination, or as being right-hand wound when its teeth take the form of a right-hand screw thread, which means that to an observer looking along the axis of the thread the teeth appear to run away from the observer clockwise and along the axis of the thread, as in Fig. 2. Where gears mesh externally as do input sun gear 12 and planet gear 14 the hand of the teeth on the two gears must be opposite. Where one of two meshing gears is an internal gear, such as gear 22, then the teeth of the two gears must be of the same hand. If the shaft 10 is rotated clockwise, as seen from the left of Fig. 1, then planet gear 14 will rotate counterclockwise so that an individual tooth 15 will appear to move upward in Fig. 3. If ring gear 22 resists rotation, the planet gear tooth 15 will contact the lower surface of a ring gear tooth 23. Then if the teeth are left hand, as is shown in Fig. 3, the sloping cam surfaces formed by the engaging faces of the teeth will slide down hill with respect to the direction of the force between them and this will tend to separate the gears axially by urging the ring gear 22 to the left and the planet gear 14 to the right, as Fig. 3 is seen. If the ring gear were fixed to the cone 24 and if the planet gear cannot move axially this would urge the cone 24 to the left toward the cone 26 to engage the cone 26 or to assist some actuator in engaging it. However, if the torque flow is in the opposite direction, for example if the input shaft 10 is rotating counterclockwise, the opposite side of a tooth 15 on the planet gear 14 will engage an upper face of a tooth 23 of the ring gear 22, as shown in Fig. 5. In this case resistance to rotation of the planet gear will tend to separate the gears axially as before, but if the planet gear 14 is fixed axially then the ring gear 22 will tend to move to the right, as shown in Fig. 5, and if the ring gear were fixed to the cone 24, this would oppose engagement of the cones. The condition will be the same, as described in the preceding sentence if the shaft 20 is driving the shaft 10 clockwise instead of having the shaft 10 driving the shaft 20 counterclockwise. That is when the torque flow is from shaft 10 to shaft 20 in one sense of rotation, the ring gear, as thus far described, will assist engagement of the friction torque establishing device. But if while the torque flow is from the shaft 20 to the shaft 10 in the same sense of rotation or if the torque flow is from shaft 10 to shaft 20 in the opposite sense of rotation the ring gear will oppose the engagement of the friction torque-establishing device. As so far described the construction of the device and its manner of operation are known.

In this example of a structure to which my invention is applicable, my invention provides a torque transmitting connection between the ring gear 22 and the cone 24 of such form that the ring gear assists the engagement of the friction torque-establishing device by urging the cone 24 toward the cone 26 whenever the cone 24 initially engages the cone 26, regardless of the direction of torque through the apparatus. One way of accomplishing this is shown in Fig. 1.

The ring gear 22 is connected to the drum 30 by internal splines or teeth 32 on the drum and mating external splines or teeth 34 on the ring gear. These splines are inclined, or helical, and are of opposite hand to the internal teeth 23 of the ring gear. The spline connection essentially prevents relative rotation between the drum and ring gear. The splines or teeth permit sliding axial movement between the drum and ring gear, but only such rotative movement as is inherent due to the slope of the splines. If the axial movement is blocked in one direction, as will be explained, resultant relative rotation is also prevented in the sense of rotation in which the parts tend to move, so that at this point the drum and ring gear become rotationally fixed or non-rotatively connected for all significant purposes of the operation. The planet gear 14 is held against axial movement by cheeks 36 and 38 of the planet carrier 18, and the carrier, which is integral with the output shaft 20, is in turn held against axial movement by the bearing 40. The ring gear 22 is axially movable to a limited extent, its movement toward the right being limited by a stop formed by a drum 42 splined in the drum 30 and held against movement to the right by a thrust bearing 44 which bears against any suitable stationary part of the transmission 46. Relative movement of the ring gear 22 with respect to the drum 30 in the opposite axial direction, that is toward the left as Fig. 1 is seen, is limited by any suitable stop fixed to the drum 30, such as the snap ring 48 seated in a groove in the drum.

The friction torque-establishing device is normally disengaged by return springs 50 and 52 which urge the cone 24 to the right and a return spring 53 which normally holds the piston 28 to the right so that all of cones are out of contact. The friction torque-establishing device may be engaged by moving the piston 28 to the left until all three cones are in engagement. This may be done in any suitable way as by having the piston slidable in a cylinder 54 to which fluid under pressure is admitted from any suitable source 56 when it is desired to set the friction torque-establishing device. The piston and cone 28 are held from rotation by dowels 58 engaging the frame of the transmission 46.

In the operation of the device, whenever pressure is applied in chamber 54 to cause initial engagement of the friction torque-establishing device, this resists rotation of the ring gear and the reaction sets up forces which increase the pressure of the friction torque-establishing device regardless of the direction of torque in the apparatus. If the shaft 10 is driving clockwise or if the shaft 20 is driving counterclockwise, the conditions are as shown in Figs. 2, 3 and 6 to 9. If the shaft 20 is driving clockwise, or if the shaft 10 is driving counterclockwise the conditions are as shown in Figs. 4, 5 and 11–13. In any case initial engagement of the friction torque-establishing device first resists rotation of the ring gear 22 through the splined drum 30, and this in turn resists rotation of the planet gear. The reaction between the ring gear and planet gear tends to move the ring gear axially, and the axial force on the ring gear is used always to urge the splined drum to the left to increase the pressure of the friction torque-establishing device.

When shaft 10 is driving clockwise a tooth 15 at the top of the planet gear 14 appears to move up in Fig. 3, and bears against the lower surface of a tooth 23 on the ring gear 22 with a force represented by the vector $N_{15}$ in Fig. 6, which vector is necessarily normal to the surface of the tooth. The force $N_{15}$ has two components $F_{15}$ and $E_{15}$. The component $F_{15}$ tends to rotate the ring gear and $E_{15}$ moves it to the left along the splines 32 until it contacts the snap ring 48. The component $F_{15}$ rotates the ring gear within the limits of the relative rotation permitted by the splines 32, 34 while the ring gear is sliding to the left, and after rotation of the ring gear stops, the force $F_{15}$ urges the ring gear splines 34 against the splines 32 on the clutch drum 30. This sets up another system of forces between splines 32 and 34. The force of the spline 34 on the spline 32 (Fig. 7) is derived from vector $F_{15}$ in Fig. 6 and is normal to the surface of the spline 32. It is represented by the vector $N_{34}$. This can be resolved into two components $F_{34}$ which tends to rotate the drum 30, and the vector $E_{34}$ which tends to move the spline drum 30 to the right. However, the spline 32 exerts force on the ring gear 22, as shown in Fig. 8. The force exerted on the spline 34 by the spline 32 is represented by the normal vector $N_{32}$ which is derived from the force of the friction torque-establishing device and has components $F_{32}$ tending to oppose rotation of the ring gear 22 and the force on the ring gear represented by vector $E_{32}$ tending to urge the ring gear 14 to the left. The vector $E_{32}$ will push the ring gear 22 against the snap ring 48 and the force on the drum 30 represented by vector $E_{34}$ will push the snap ring to the right against the gear.

In the snap ring the force will therefore be as shown in Fig. 9 in which the force $E_{34}$ urges the snap ring 48 to the right and the force $E_{32}$ urges the snap ring to the left. These two forces being equal and opposite cancel out. This leaves the force $E_{15}$ from Fig. 6 acting on the snap ring and urging it to the left to engage the cones until the cones 24—26 offer an equal and opposite resistance, represented by the force $E_{26}$. The force $E_{15}$ constitutes the energizing or assisting force with which the device assists cylinder 54 to engage the friction torque-establishing device.

To summarize, as will be apparent from Fig. 3 the sloping surfaces of the teeth 15 and 23 form cam surfaces tending to wedge the ring gear and planet gear apart axially. Since the planet gear 14 cannot move axially this forces the ring gear 22 to the left. Its movement to the left relative to the drum 30 is limited by the snap ring 48 so that the spline or tooth 34 is in effect locked in the corner formed by the snap ring and the sloping surfaces of the spline or tooth 32. This balances out any reaction between the sloping faces of the splines so that the force urging the ring gear to the left, represented by the vector $E_{15}$ in Figs. 2 and 3, exerts direct axial thrust through snap ring to the cone 24 urging the cone to the left as indicated by the vector $E_{15}$. This assists engagement of the friction torque-establishing device and requires less force in the cylinder 54, which is to say lower pressure in the supply system 56 to sustain a given torque reaction in the ring gear required to transmit a given torque from the input shaft 10 to the output shaft 20.

Figure 11:
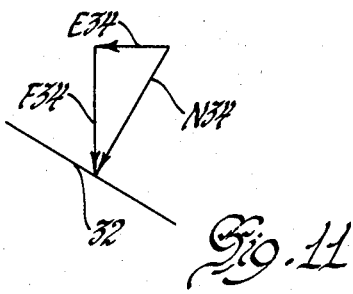
Figure 12:
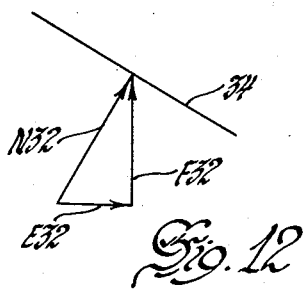
Figure 13:
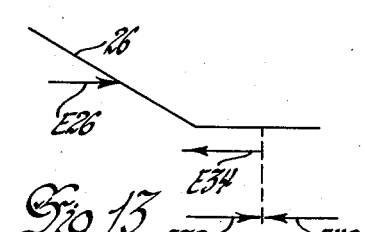

On the other hand, if the shaft 10 is driving counterclockwise the relationships will be as shown in Figs. 4 and 5 with forces as shown in Figs. 10-13. Tooth 15 of the planet gear 14 moves downwardly, as Fig. 5 is seen and bears against the upper face of a tooth 23 of ring gear 22. The tooth 15 exerts on the tooth 23 a force normal to the surface of contact represented by the vector $N_{15}$ in Fig. 10 which is opposite in direction to the vector $N_{15}$ in Fig. 6, and may be resolved into two components $F_{15}$ and $E_{15}$. The force $E_{15}$ will cause the internal gear to slide to the right along the spline 32 until the ring gear strikes the stop drum 42. This establishes another system of forces between the splines of the ring gear 22 and drum 30 which is shown in Figs. 11 and 12. The spline 34 on the ring gear exerts a force $N_{34}$ normal to the surface of the spline 32 on the spline drum and this force can be resolved into two components $E_{34}$ and $F_{34}$. $E_{34}$ urges the drum to the left. As shown in Fig. 12 the spline 32 also exerts a force $N_{32}$ normal to the surface of the spline 34 on the ring gear and this may be resolved into two components $F_{32}$ and $E_{32}$. The force $E_{32}$ pushes the ring gear to the right until it is stopped by the stop drum 42. When this occurs the axial force on the drum 30 will be as shown in Fig. 13. The force $E_{32}$ which urges the drum to the right is cancelled out by the force $E_{42}$ exerted by the stop drum leaving the force $E_{34}$ to push the drum 30 to the left until it is stopped by the axial and opposite force $E_{26}$ offered by the clutch drum 26.

To summarize the foregoing explanation, when the friction torque-establishing device resists rotation of the ring gear and the shaft 10 is driving counterclockwise this urges the ring gear 22 and the planet gear 14 to separate axially, as before, but urges the ring gear to the right as in Fig. 5 instead of to the left as in Fig. 3. Movement of the ring gear to the right is stopped by the drum 42 so that the ring gear becomes axially fixed. In trying to rotate, the ring gear presses its spline 34 against the spline 32 of the drum 30 tending to wedge the ring gear 22 and drum 30 apart. Since the ring gear is held by the stop drum 42 the force wedges or cams the drum 30 to the left, as shown in Fig. 4 again assisting the engagement of the friction torque-establishing device.

Although the cone 24 is gripped between two cones 26 and 28 the assisting action of the cone 24 can occur only when the cone 24 is urged to the left against the fixed cone 26 and could not occur if the cone 24 were urged to the right against the cone 28. The reason for this is that the drum 26 is fixed axially so that any force urging cone 24 against cone 26 inherently and necessarily increases the pressure between the surfaces of the friction torque-establishing device. On the other hand if the cone 24 were urged to the right to engage the cone 28 the force of engagement would remain constant because the force of the hydraulic pressure in the cylinder 54 remains constant and this determines the engagement pressure between cones 24 and 28 and this engagement pressure cannot be increased by moving the cone 24 toward the cone 28. Such motion would only move the cone 28 against the constant force of the piston.

In Fig. 1 the transmission output shaft 20 is driven at reduced speed by the planetary reduction gear in which torque is established by holding a reaction gear stationary by means of a cone friction torque-establishing device. In the form shown in Fig. 14 input shaft 10' drives an output shaft 20' by means of a friction torque-establishing device which connects the shafts to rotate at the same speed. The shafts 10' and 20' may be connected by the friction torque-establishing device including cones 26' and 28' fixed for rotation with the shaft 20' and the cone 24' fixed to the drum 30' which has only limited rotation with respect to the shaft 10' and becomes fixed for rotation with the shaft 10' after initial engagement of the cones and the resultant slide movement of the self-energizing assisting device. In this case the end of the shaft 10' is provided with splines 64 which mate with internal splines 23' on a ring 22'. The ring forms an intermediate torque transmitting member between the shaft 10' and the cone 24' and corresponds to the ring gear 22 in Fig. 1. The ring 22' is connected to the cone 24' by external splines 34' mating with internal splines 32' on a drum 30' integral with the cone 24'. The splines 64 correspond to the teeth 15 of the planet gear 14 in Fig. 1 and are of the same hand as shown in Fig. 18. The splines 32' and 34' corresponding to the splines 32 and 34 in Fig. 1 are of opposite hand from that of the spline 64 as shown in Fig. 17. The friction torque-establishing device may be energized by fluid under pressure admitted to the cylinder 54' by any suitable passage in the shaft 20' from the source of supply 56. The cones may be disengaged when the pressure is released by return springs 70 and 72.

The device of Fig. 14 operates similarly to the device of Fig. 1. When the shaft 10' is driving counterclockwise rather than clockwise as in Fig. 1 and the cones are initially engaged by pressure in the cylinder 54' the left hand splines 64 engage the splines of the ring 22' and urge it to the left against the snap ring as shown in Figs. 15 and 16 which will be recognized as corresponding to Figs. 2 and 3. This in turn urges the snap ring 48 to the left as shown in Fig. 15 and as explained in connection with Fig. 1. When the shaft 10' rotates clockwise the splines 64 urge the ring 22' to the right as seen in Fig. 18 until the ring engages the thrust bearing 42' which corresponds to the stop drum 42 in Fig. 1. Thereafter the ring 22' through the splines 34' bears on the splines 32' to wedge them to the left, as seen in Fig. 17.

In the form of the invention shown in Fig. 14 I establish torque in either direction between a pair of torque transmitting shafts 10' and 20' which are also relatively rotatable elements. That is they are relatively rotatable when torque is not established between them and they are fixed relatively to each other when the two shafts are clutched together. However, during the transition period between the initial engagement of the friction torque-establishing device when the shafts are rotating relatively, and the final engagement at which time the shafts are fixed with respect to each other, there is slip in the friction torque-establishing device. But, there is also force exerted by the friction torque-establishing device and this force establishes torque between the shafts although they are rotating relative to each other. This torque establishes torque between cone 24' and the ring 22', which in turn establishes torque between the ring 22' and the shaft 10'.

It is torque between the ring 22' and the shaft 10' on one hand and between the ring 22' and the cone 24' on the other hand which is used to energize the assisting means.

In the modification of Fig. 1 when either shaft 10 or 20 is rotating and the friction torque-establishing device is engaged, one shaft necessarily rotates relative to the other, although they are connected by the friction torque-establishing device and the planetary gear set in torque transmitting relation.

In this case the initial engagement of the friction torque-establishing device establishes torque between the shafts 10 and 20 but it also establishes torque between two other relatively rotatable elements, namely the shaft 10 and the casing 46, by establishing torque between the cone 24 and the ring gear 22 and in turn between the ring gear 22 and the planet gear 14, which in turn establishes torque between the planet gear 14 and the shaft 10. The torque thus established between the shaft 10 and the casing 46 and specifically that torque between the cone 24 and the ring gear 22 and between the ring gear 22 and the planet gear 14 is used to connect shafts 10 and 20 in torque transmitting relation by fixing to each other the two relatively rotatable members, namely the ring gear 22 and the casing 46. In this case initial engagement of the friction torque-establishing device establishes torque between the shafts but it also establishes torque between two other relatively rotating members and this latter torque is used to assist in energizing the friction torque-establishing device.

In both modifications I use an intermediate member, namely the ring gear 22 or the ring 22' which is connected in torque transmitting relation to one of the shafts. This intermediate member assists the friction torque-establishing device to establish drive between the shafts when torque is established between that intermediate member and another relatively rotatable part whether such other part is the casing 46 in Fig. 1 or the shaft 20' in Fig. 14.

In both forms of the invention one of the members of the friction torque-establishing device is defined as adapted to be rotationally fixed with respect to the intermediate member. This refers to the spline connection between the cone 24 and the ring gear 22 in Fig. 1 and to the spline connection between the cone 24' and the ring 22' in Fig. 14. The friction member 24 or 24' is for all practical purposes fixed with respect to the intermediate member 22 or 22'. Rotational movement between the two is limited and such limited relative rotation is not significant, being merely that incidental amount of rotation which necessarily accompanies axial movement of the inclined splines.

Also, in both embodiments of the invention I use cam surfaces on the relatively rotating parts which are formed by the splines 30, 32 and the gear teeth 15, 23 in Fig. 1 and are formed by the splines 64, 32' and 34' in Fig. 14, and I use oppositely acting axial forces on these cams to produce in either case axial force in the same direction.

I claim:

1. A transmission comprising in combination a pair of relatively rotatable elements; a planetary gearset for establishing torque between said elements and including a sun gear connected to one element, a planet carrier connected to the other element, an axially fixed planet gear journaled on the carrier and meshing with the sun gear, and a reaction ring gear meshing with the planet gear through teeth having one hand of inclination to the axis of rotation whereby the ring gear is adapted to be urged axially by torque reaction with the planet gear; means for at times holding the ring gear to establish torque between the first mentioned pair of elements, said means including a first friction means which is axially movable and is connected to the ring gear through teeth having an inclination of opposite hand to the inclination of the first-mentioned teeth, a second friction means which is rotationally fixed, and means for at times engaging the two friction means; and self-energizing assisting means adapted to urge the friction means together in response to existence of torque between the first-mentioned elements, said assisting means including means for limiting relative axial movement of the ring gear in one direction with respect to the first friction means, and means for limiting axial movement of the ring gear in the opposite direction absolutely.

2. In a mechanism for transmitting torque, the combination of a first torque-transmitting element; a planetary gearset having a torque-transmitting gear connected to said first element, a planet gear meshing with the torque-transmitting gear and journaled on a carrier which is connected to a second torque-transmitting element, and a torque-sustaining reaction gear meshing with the planet gear and adapted to be urged to move axially by torque reaction between the planet gear and reaction gear; means for at times holding the reaction gear including a first friction means adapted to be rotationally fixed to the reaction gear, a second friction means which is rotationally fixed, and means for at times engaging the two friction means; and self-energizing assisting means adapted to urge the first friction means toward the second friction means in response to the existence of torque between said torque transmitting elements, said assisting means including a first surface fixed to the first friction means, a second surface fixed to the reaction gear, said surfaces being engageable to establish torque between the reaction gear and first friction means, and said surfaces being adapted to urge the reaction gear and first friction means axially apart in one direction when the torque between the torque-transmitting elements is in one direction and to urge the first friction means and the reaction gear apart axially in the other direction when the torque between the torque-transmitting elements is in the other direction, means for limiting axial movement in one direction between the first friction means and the reaction gear, and means for limiting axial movement of the reaction gear in the opposite direction absolutely.

3. A transmission comprising in combination a pair of relatively rotatable elements; a planetary gearset for establishing torque between said elements and including a sun gear connected to one element, a planet carrier connected to the other element, an axially fixed planet gear journaled on the carrier and meshing with the sun gear, and a reaction ring gear meshing with the planet gear through teeth having one hand of inclination to the axis of rotation whereby the ring gear is adapted to be urged axially by torque reaction with the planet gear; means for at times holding the ring gear to establish torque between the first mentioned pair of elements, said means including a rotatable and axially movable drum carrying a first friction means, teeth on the drum having an inclination of opposite hand to the inclination of the first-mentioned teeth, teeth on the ring gear mating with the teeth on the drum, a second friction means which is rotationally fixed, and means for at times engaging the two friction means; and self-energizing assisting means adapted to urge the friction means together in response to existence of torque between the first-mentioned elements, said assisting means including a stop on the drum for limiting relative axial movement of the ring gear in one direction with respect to the first friction means, and a fixed stop for limiting axial movement of the ring gear in the opposite direction absolutely.

4. A transmission comprising in combination a pair of relatively rotatable elements; a planetary gearset for establishing torque between said elements and including a sun gear connected to one element, a planet carrier connected to the other element, an axially fixed planet gear journaled on the carrier and meshing with the sun gear, and a reaction ring gear meshing with the planet gear through teeth having one hand of inclination to the axis of rotation whereby the ring gear is adapted to be urged axially by torque reaction with the planet gear; means for at times holding the ring gear to establish torque between the first-mentioned pair of elements, said means including a first friction means which is axially movable and is connected to the ring gear through teeth having an inclination of opposite hand to the inclination of the first-mentioned teeth, a second friction means which is rotationally fixed, and means for at times engaging the two friction means; and self-energizing assisting means adapted to urge the friction means together in response to existence of torque between the first-mentioned elements in either direction of rotation or in either direction of power flow.

5. A transmission comprising in combination a pair of relatively rotatable elements; means for establishing torque between said elements including an axially movable ring positively connected in torque transmitting relation to one of said elements by means including a plurality of positively driving slidable teeth having one hand of inclination with respect to the axis of rotation whereby the ring is adapted to be rotated positively and to be urged axially in response to torque reaction between the ring and said one element, means for at times connecting the ring to the other element including an axially movable first friction means connected to the ring by a plurality of positively driving slidable teeth having the opposite hand of inclination, a second friction means rotationally fixed to the other element, means for at times engaging the two friction means, and self-energizing assisting means adapted to urge the first friction means toward the second friction means in response to engagement of said friction means and establishment of torque between the elements, said assisting means including means for limiting relative axial movement of the ring in one direction with respect to the first friction means and means for limiting axial movement of the ring in the opposite direction absolutely.

6. A transmission comprising in combination a pair of relatively rotatable elements, means for establishing torque between the elements including an axially movable ring positively connected in torque transmitting relation to one element by means including a plurality of positively driving slidable teeth having one hand of inclination with respect to the axis of rotation whereby the ring is adapted to be rotated positively and to be urged axially in response to torque reaction between the ring and said one element, a friction torque-establishing device which when engaged is adapted to establish torque between the elements, the friction torque-establishing device including a first friction means connected to the ring by a plurality of positively driving slidable teeth having the opposite hand of inclination, a second friction means rotatably fixed to the other element, means for at times engaging the two friction means, and self-energizing assisting means adapted to urge the first friction means toward the second friction means in response to engagement of the friction means and existence of torque between the relatively rotatable elements, said assisting means including means for limiting relative axial movement of the ring in one direction with respect to the first friction means and means for limiting axial movement of the ring in the opposite direction absolutely.

7. In a two-way self-energizing friction torque-establishing device for establishing torque between two members which at least at times are relatively rotatable, the combination of a first friction means secured to the first of said members by a connection permitting only limited rotation of said friction means with respect to said first member; a second friction means non-rotatably secured to the second of said members; means for at times urging one friction means into contact with the other friction means; and self-energizing assisting means adapted to urge the friction means toward each other whenever either relatively rotatable member is exerting torque on the other relatively rotatable member, said assisting means including an intermediate member between the first member and the first friction means, the intermediate member being positively connected for rotation to the first member by a plurality of teeth inclined in one direction to the axis of rotation, and the intermediate member being positively connected for rotation to the first friction means by a plurality of teeth inclined in the opposite direction to the axis of rotation, means for limiting axial movement of the intermediate member in one direction, and means for limiting relative axial movement of the first friction means with respect to the intermediate member in the same direction.

8. A force transfer device including in combination a force transmitting member, power means adapted selectively to rotate the force transmitting member positively in either of two opposite primary directions, means responsive to force of the power means in one primary direction for urging the force transmitting member in a first direction which is transverse to the primary directions and responsive to force of the power means in the opposite primary direction for urging the force transmitting member in the opposite transverse direction, a force receiving member, a connection between the members adapted to urge the members apart in such transverse directions in response to force of the power means in either primary direction and means responsive to force between the members in either primary direction for urging the force receiving member in the same transverse direction.

9. A force transfer device including in combination a rotatable force transmitting member, power means adapted selectively to drive the force transmitting member in either sense of rotation, a connection between the power means and force transmitting member said connection including mating teeth for positively rotating the force transmitting member, said teeth being inclined in one direction to the axis of rotation for urging the force transmitting element axially in opposite directions in response to torque in opposite directions between the power means and force transmitting member, a force receiving member, a connection between the members including mating teeth inclined in the opposite direction to the axis of rotation to urge the elements apart axially in response to torque between the elements, means for limiting axial movement of the force transmitting element in one direction relative to the force receiving element, whereby axial force in one direction on the force transmitting element will urge the force receiving element in the same axial direction in response to torque in one sense on the force transmitting element, and means for limiting axial movement of the force transmitting element in the other direction absolutely, whereby the torque receiving element will be urged axially in the same direction in response to torque in the opposite sense on the force transmitting element.

References Cited in the file of this patent
UNITED STATES PATENTS

| | | |
|---|---|---|
| 1,683,715 | Erban | Sept. 11, 1928 |

FOREIGN PATENTS

| | | |
|---|---|---|
| 133,521 | Australia | July 18, 1949 |
| 681,628 | Germany | Sept. 27, 1939 |
| 1,083,931 | France | June 3, 1954 |

UNITED STATES PATENT OFFICE

CERTIFICATE OF CORRECTION

Patent No. 2,882,757                                             April 21, 1959

Bruce M. Edsall

It is hereby certified that error appears in the printed specification of the above numbered patent requiring correction and that the said Letters Patent should read as corrected below.

Column 10, line 46, claim 9, after "teeth" insert -- for positively rotating the force receiving member, said teeth being --; same column 10, list of references cited, under the heading "UNITED STATES PATENTS", insert the following:

2,729,980     Lammerz et al. ----- Jan. 10, 1956

2,763,162     Herndon ----------Sept. 18, 1956

Signed and sealed this 15th day of September 1959.

(SEAL)
Attest:

KARL H. AXLINE                                               ROBERT C. WATSON
Attesting Officer                                          Commissioner of Patents